US006807802B2

(12) United States Patent
Platts

(10) Patent No.: US 6,807,802 B2
(45) Date of Patent: Oct. 26, 2004

(54) SINGLE ROTOR TURBINE

(75) Inventor: David A. Platts, Los Alamos, NM (US)

(73) Assignee: The Regents of the University of California, Los Alamos, NM (US)

( * ) Notice: Subject to any disclaimer, the term of this patent is extended or adjusted under 35 U.S.C. 154(b) by 276 days.

(21) Appl. No.: 10/209,308

(22) Filed: Jul. 30, 2002

(65) Prior Publication Data

US 2003/0230070 A1 Dec. 18, 2003

Related U.S. Application Data

(63) Continuation-in-part of application No. 09/779,977, filed on Feb. 9, 2001, now Pat. No. 6,430,917.

(51) Int. Cl.[7] .................................................. F02C 3/04

(52) U.S. Cl. ....................................................... 60/39.43
(58) Field of Search ......................... 415/58.5; 60/39.43, 60/804, 805, 726

(56) References Cited

U.S. PATENT DOCUMENTS 5,232,333 A * 8/1993 Girault ....................... 415/58.5

* cited by examiner

Primary Examiner—Ehud Gartenberg
(74) Attorney, Agent, or Firm—Milton D. Wyrick

(57) ABSTRACT

A rotor for use in turbine applications has a centrifugal compressor having axially disposed spaced apart fins forming passages and an axial turbine having hollow turbine blades interleaved with the fins and through which fluid from the centrifugal compressor flows.

5 Claims, 3 Drawing Sheets

SINGLE ROTOR TURBINE

This is a continuation-in-part application out of U.S. patent application Ser. No. 09/779,997, filed Feb. 9, 2001, now U.S. Pat. No. 6,430,917 and currently in receipt of a Notice of Allowance.

This invention was made with Government support under Contract No. W-7405-ENG-36 awarded by the U.S. Department of Energy. The Government has certain rights in the invention.

FIELD OF THE INVENTION

The present invention generally relates to turbines and more specifically to rotors used in turbine applications.

BACKGROUND OF THE INVENTION

Since the earliest use of water to turn a wheel, turbines have provided needed mechanical action for myriad functions. In modern times, turbines are used to generate electricity, power jet aircraft and increase the power of automobiles using turbochargers. Many turbine applications use two rotors on the same shaft so that one turbine powers the other. When the rotors are on a fairly long connecting shaft problems of balance, shaft whip, and multiple vibrational modes become worse. These can cause various problems up to the failure of the machine.

Smaller turbine engines are now being used for local power generation applications as backup power and for peak shaving. The U.S. Department of Energy (DOE) is planning to use similar smaller turbines for distributed energy generation in homes. In these smaller turbines, the turbine blades are not cooled so the turbine entrance temperatures must be more severely limited to avoid damage. However, in general, the higher the turbine inlet temperature of a turbine engine, the more efficient it is. Therefore, the efficiency of a turbine engine is determined by the ability of the turbine's nozzles and blades to withstand the heat of the exhaust gases that pass through them.

In larger turbines, it is not unusual to find that approximately one-third of the air moved through them is used for cooling nozzles and blades and not for power production. Prior research has concentrated on developing materials that can withstand higher temperatures for use as turbine parts. However, these higher temperature materials generally are rare and quite expensive. Other research has been in the area of schemes for cooling the components. Likewise, these schemes are costly and inefficient. Present turbine engines of all sizes do not operate anywhere near the theoretical maximum efficiency, and small engines, which lack feasible blade cooling schemes are less efficient.

Many of the schemes for cooling the blades and bearings of turbine engines have involved using various patterns of cooling channels bored into the blades. For example, U.S. Pat. No. 4,522,562, issued Jun. 11, 1985 to Glowacki and Mandet, discloses a cooling scheme in which a turbine disc has a set of channels bored near each of two sides of a disc that conform with the profile of the disc. Each set of channels carries cooling air to superficially cool the disc.

Other attempts to improve turbine operation have been directed to having turbine wheels or rotors that function as both compressors and turbine sections. A prior art example of this can be found in U.S. Pat. No. 4,757,682, issued Jul. 19, 1988, to Bahniuk. This patent discloses a fluid flow that is directed over the compressor section to effect multiple compression stages, with the same air passages being used for both the compression stages and the exhaust air flow. There is no teaching or suggestion of using separate compression intake and exhaust passages that are interleaved in the same rotor or wheel.

A pair of patents, U.S. Pat. No. 3,709,629, issued Jan. 9, 1973, and related U.S. Pat. No. 4,070,824, issued Jul. 19, 1988, both to Traut, disclose a gas turbine having a rotor that serves as both compressor and turbine. The turbine engine utilizes stationary arcuate members located in close proximity to the rotor that direct the flow of combustion products against the rotor blades to cause rotation. The arcuate members also serve to cool the rotor and provide a path for the subsequent exhausting of the combustion flow. These functions are accomplished by a complex ducting arrangement that is completely different than the present invention. The mixing of the flows, sealing problems, and non standard flow passages are problems in the design of this patent, as we well as the preceding patent.

There is not yet a reliable and practical way to cool the turbine of small gas turbine engine. Multiple rotor turbo machines such as engines, turbochargers, refrigeration compressors, and others all suffer from dynamic problems caused by the shaft and rotor system.

Therefore, it is an object of the present invention to provide a practical turbine blade cooling scheme for small gas turbine engines.

It is another object of the present invention to provide a single rotor for a gas turbine engine that has better known and studied flow paths than those of the prior art.

It is still another object of the present invention to provide a rotor for turbomachinery that performs the functions of two rotors in only one rotor, thus eliminating the shaft and the problems it introduces.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, a rotor for use in turbine applications comprises a centrifugal compressor having axially disposed spaced apart fins forming passages, and an axial turbine having hollow turbine blades through which air from the centrifugal compressor flows.

In a further aspect of the present invention, and in accordance with its objects and purposes, a turbine engine comprises a turbine engine housing, the turbine engine housing having a compressed air volute and a exhaust scroll, with a single rotor mounted to a shaft inside the turbine engine housing, the rotor having a centrifugal compressor with axially disposed spaced apart fins forming passages, and an axial turbine having hollow turbine blades interleaved with the fins and through which air from the centrifugal compressor flows. Wherein the centrifugal compressor compresses air into the compressed air volute and heated exhaust air is directed into the hollow turbine blades from the exhaust scroll, causing the shaft to rotate.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

The present invention provides an innovative single rotor for use in turbine machines of all types. The invention may be understood most easily through reference to the drawings.

Figure 1:
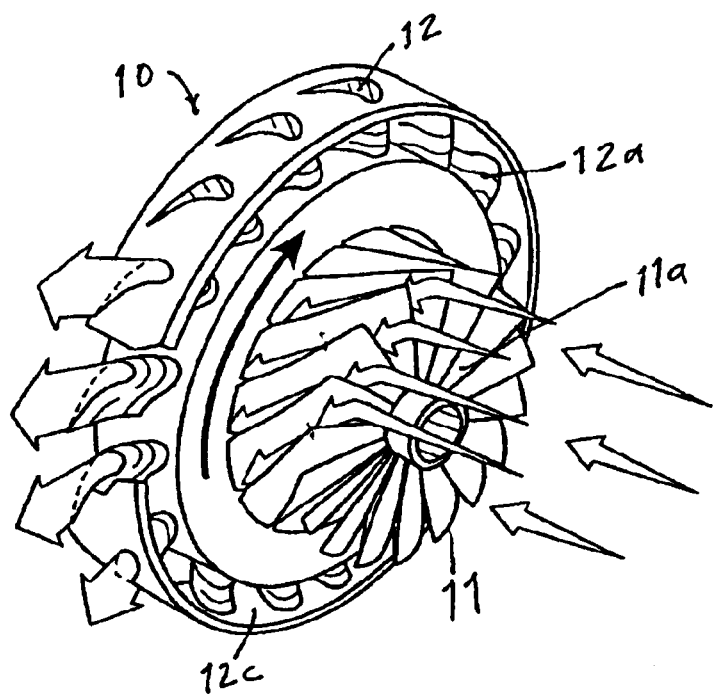
FIG. 1 is a perspective illustration of an embodiment of the invention showing the rotor viewed from the side having the radial compressor.

Referring now to FIG. 1, there can be seen a perspective view of an embodiment of rotor 10 showing its intake side featuring radial compressor 11 having fins 11a. Compressor fins 11a compress incoming fluid and direct if into compressor ducts 12 that also serve as axial turbine blades 12a in turbine area 12c. Incoming fluid exchanges heat with axial turbine blades 12a as it passes through them on the way to a compressed fluid volute as will hereinafter described.

Figure 2:
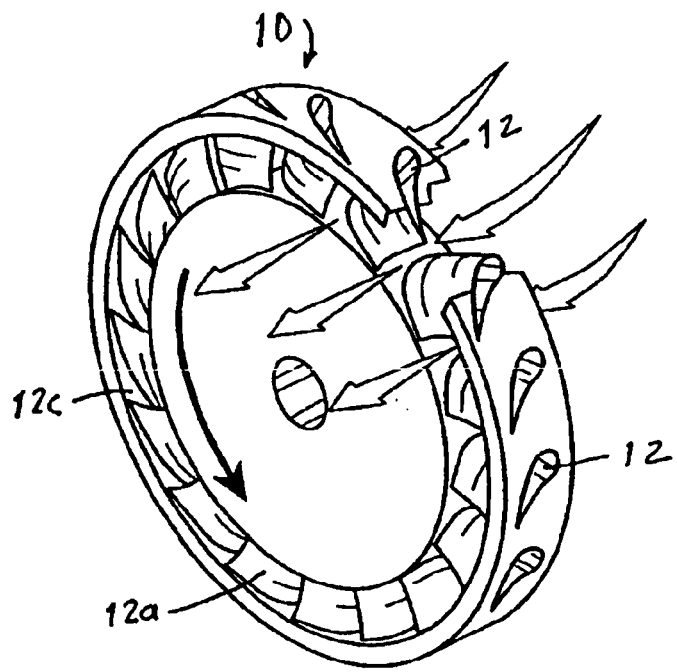
FIG. 2 is a perspective illustration of the embodiment shown in FIG. 1 viewed from the opposite side.

In FIG. 2, the opposite side of rotor 10 is seen in perspective and shows how fluid flowing through axial turbine blades 12a turns rotor 10. As one example in the case of prior art turbine engines the flow of combustion gasses through the axial turbine blades would transfer heat to them causing them to run at the temperature of the gas. When the present invention is used as a turbine engine, due to the interleaving of passages, cooling of turbine blades 12a with the airflow from compressor fins 11a (FIG. 1) is provided so that the temperature of the turbine blades 12a is cooler than the combustion gasses driving turbine blades 12a.

Figure 3:
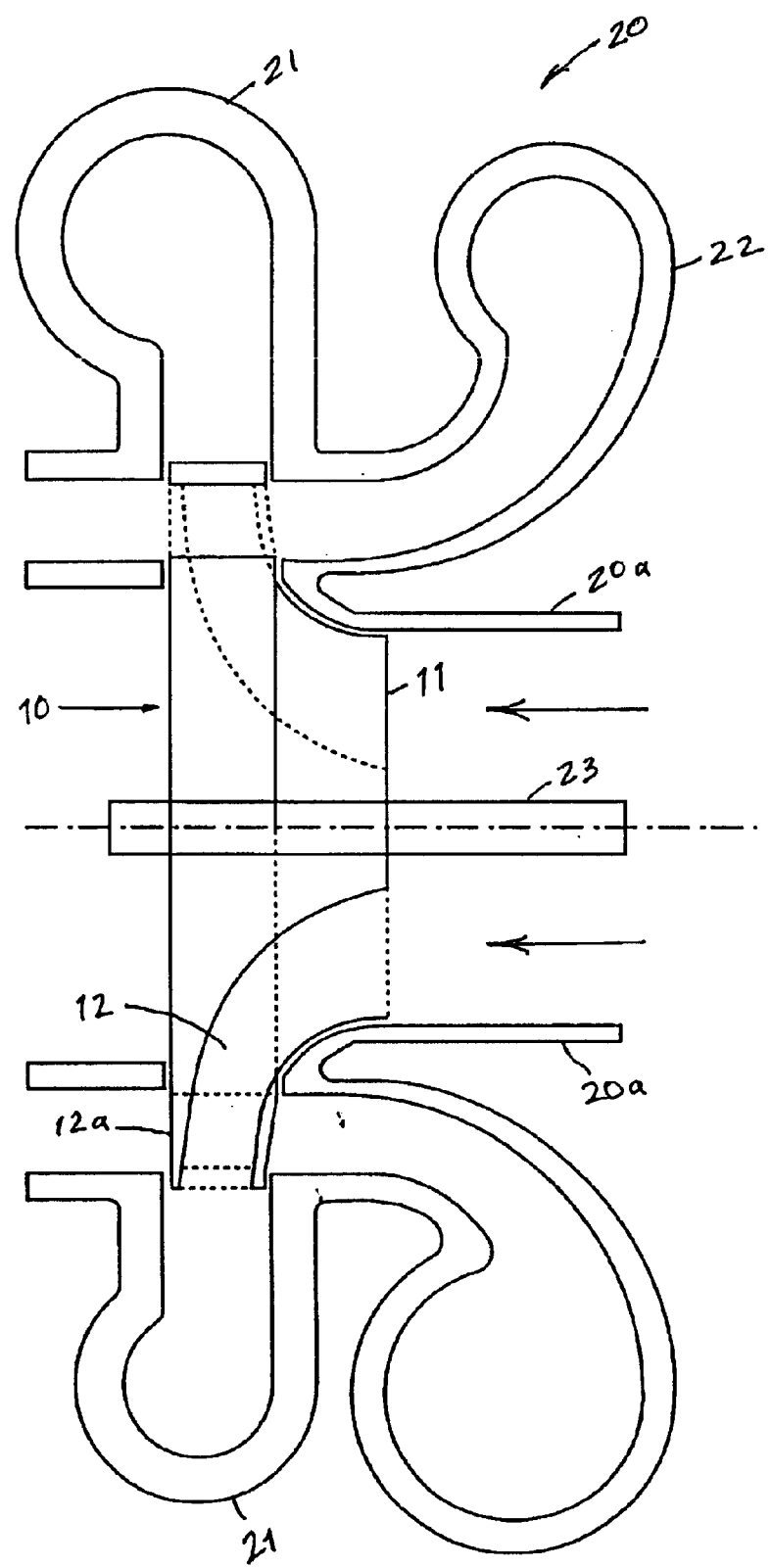
FIG. 3 is a cross-sectional illustration of the rotor of the present invention in a turbomachine which with the addition of a combustion chamber would be one possible engine configuration.

An example of one application of turbine rotor 10, turbine rotor is shown in a turbomachine illustrated in FIG. 3. In this figure, and in the following FIG. 4, a cross section of the turbomachinery is shown. Rotor 10, with an odd number of passages, is shown rotated so that in the upper part of the drawings the axial turbine passages are cut through, and the in the lower part the centrifugal passages are cut through. This emphasizes each of these flow paths separately although all of the flow paths are open and functional all the time as they would be in conventional non interleaved turbine rotors. This illustration will better show the operation of rotor 10. As seen turbomachine 20 has compressed fluid volute 21 and turbine drive scroll 22. Rotor 10 is mounted in turbomachine 20 on shaft 23. Turbomachine 20 also defines fluid baffle 20a. Fluid flowing from right to left in FIG. 3 is directed into compressor fins 11a (FIG. 1), compressed by radial compressor 11 and directed into compressor ducts 12 and into compressed fluid volute 21.

Pressurized fluid in the turbine drive scroll 22 flows through turbine blades 12a thereby imparting rotational energy to rotor 10 and turning shaft 23. In the case when this turbomachine is used as a gas turbine engine the input fluid would be air and the fluid driving the turbine would be the burnt and diluted gas from the combustion chamber. For the sake of simplicity and the clear understanding of the benefits of rotor 10, the requisite combustion chamber and air connection between compressed "air" volute 21 and "exhaust" scroll 22 are not shown.

Figure 4:
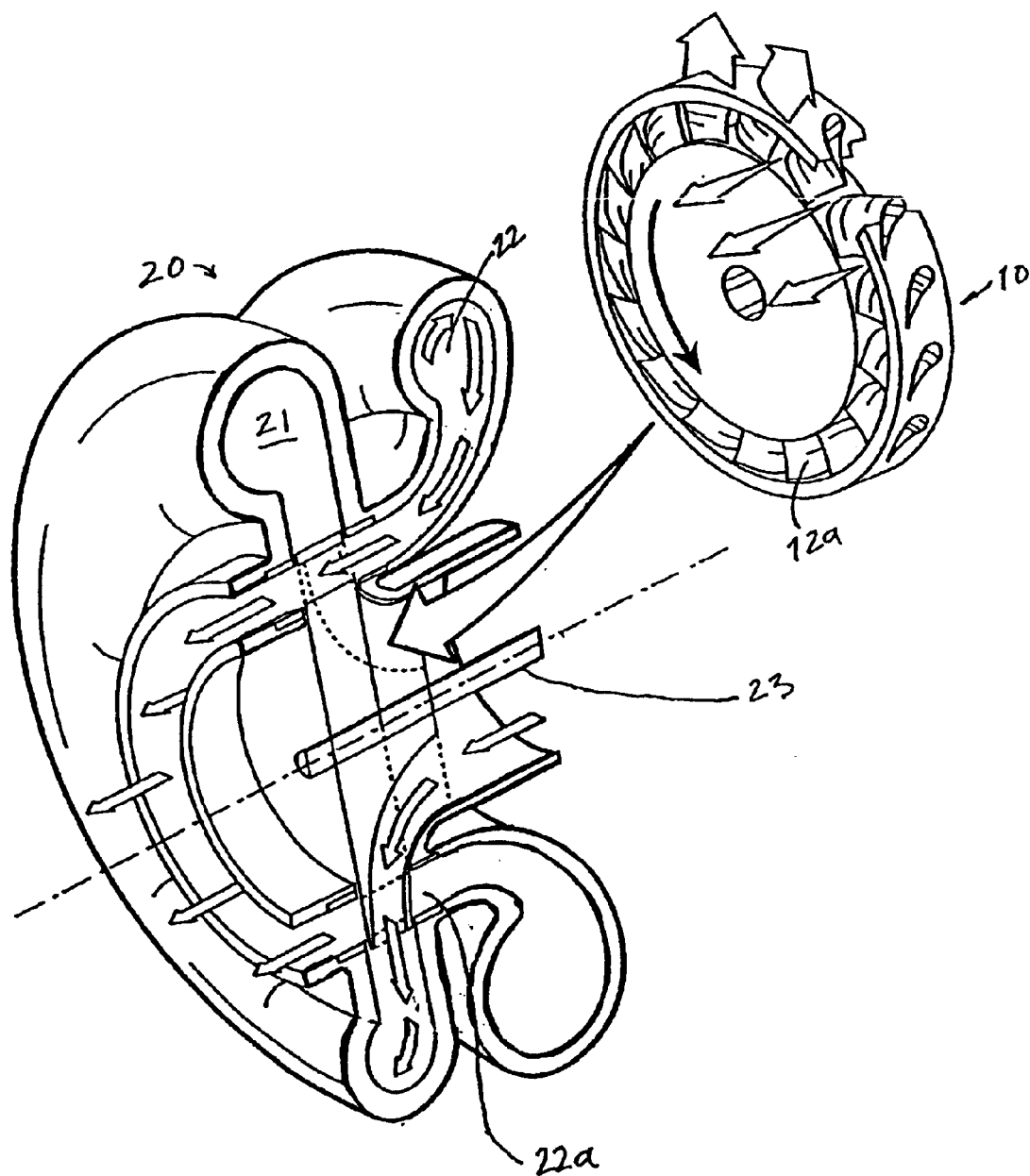
FIG. 4 is a cut-away orthogonal view of the rotor of the present invention and the turbomachine of FIG. 3 allowing a better understanding of the application of the present invention to a particular use.

An orthogoanal cutaway illustration of engine 20 is shown in FIG. 4. As seen, rotor 10 mounts to shaft 23 and fits inside engine 20. When installed, compressor ducts 12 mate with compressed fluid volute 21 and axial turbine blades 12a mate with output 22a of turbine drive scroll 22.

FIGS. 3 and 4 amply portray the compactness yet powerful nature of the present invention. But perhaps equally important is that the present invention incorporates compressor and turbine into one compact rotor structure that provides cooling of the turbine blades without sacrificing any efficiency. Because of these factors, as well as others, it is clear that the present invention can be utilized beneficially in myriad applications.

The present invention provides a rotor 12 that is a single wheel having interleaved flow passages such that rotor 12 functions as both a centrifugal turbine and an axial turbine. In use as a small gas turbine engine, and as previously described, the centrifugal passages become the compressor and the axial passages become the turbine. The axial turbine is cooled by the flow of intake air through the turbine blades. In turn these passages through the blades form part of the centrifugal compressor. These flows remain separate and their passage shapes conform to standard engineering practice. The passages are large and the rotor can be economically fabricated using conventional techniques such as investment casting.

The foregoing description of the embodiments of the invention has been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A rotor for use in turbine applications comprising:
   a centrifugal compressor having axially disposed spaced apart fins forming passages; and
   an axial turbine having hollow turbine blades interleaved with said fins and through which fluid from said centrifugal compressor flows.

2. The rotor as described in claim 1 wherein said passages are connected to said hollow turbine blades.

3. The rotor as described in claim 1 wherein said rotor is mounted to a shaft inside a turbine engine housing defining a compressed air volute and an exhaust scroll, wherein said centrifugal compressor compresses air into said compressed air volute and heated exhaust air is directed into said hollow turbine blades from said exhaust scroll, causing said shaft to rotate.

4. A turbine engine comprising:
   a turbine engine housing, said turbine engine housing having a compressed air volute and a exhaust scroll;
   a single rotor mounted to a shaft inside said turbine engine housing, said rotor having a centrifugal compressor with axially disposed spaced apart fins forming passages, and an axial turbine having hollow turbine blades interleaved with said fins and through which air from said centrifugal compressor flow;

wherein said centrifugal compressor compresses air into said compressed air volute and heated exhaust air is directed into said hollow turbine blades from said exhaust scroll, causing said shaft to rotate.

5. The rotor as described in claim 4 wherein said passages are connected to said hollow turbine blades.

* * * * *